United States Patent [19]

Keck et al.

[11] 3,977,310
[45] Aug. 31, 1976

[54] METHOD OF SCORING FRACTURABLE ADHESIVE BACKING

[75] Inventors: Jerry L. Keck, Chicago; James Robert Rowley, Calumet Park, both of Ill.

[73] Assignee: Ludlow Corporation, Needham Heights, Mass.

[22] Filed: Nov. 27, 1972

[21] Appl. No.: 309,705

Related U.S. Application Data

[62] Division of Ser. No. 169,653, Aug. 6, 1971, Pat. No. 3,719,548.

[52] U.S. Cl. ............................. 93/58 ST; 93/58.1; 83/12; 83/7
[51] Int. Cl.² ......................................... B26D 3/08
[58] Field of Search .......... 93/58 ST, 58.2 R, 58 R, 93/1 R, 58.1; 83/12, 6, 7, 8; 225/96

[56] References Cited
UNITED STATES PATENTS

| | | | |
|---|---|---|---|
| 1,859,513 | 5/1932 | Hope et al. | 93/58.1 X |
| 2,319,272 | 5/1943 | Starr | 161/117 |
| 3,006,793 | 10/1961 | Wheeler | 161/411 X |
| 3,035,957 | 5/1962 | Morgan | 161/411 X |
| 3,558,425 | 1/1971 | Massari | 161/231 X |
| 3,570,337 | 3/1971 | Morgan | 83/12 |

*Primary Examiner*—James F. Coan
*Attorney, Agent, or Firm*—Cesari and McKenna

[57] ABSTRACT

A process and apparatus for selectively compressing paper stock of the type which is used as a protective backing sheet for adhesive-coated systems. The process comprises use of a novel compression tool, the precise characteristics of which depend on the paper stock being utilized. The compression tool comprises a blunt, rotatable, circular, working edge which has a radius of at least 0.02, but preferably at least 0.04 inches in diameter and at least one half of the thickness of the paper being weakened. This tool advantageously comprises the compressing edge, being mounted integrally with a bearing surface which makes pressure control easier and limits penetration of the tool. In the preferred embodiments of the invention, the bearing surface is faced with elastomeric material. Disclosure is also made of a novel release sheet and adhesive sheet assembly which is manufactured utilizing the process and apparatus of the invention.

5 Claims, 7 Drawing Figures

METHOD OF SCORING FRACTURABLE ADHESIVE BACKING

RELATED APPLICATION

This application is a Divisional Application divided out of U.S. Ser. No. 169,653 filed Aug. 6, 1971 by Jerry L. Keck and James Robert Rowley and entitled "Fracturable Adhesive Backing" now U.S. Pat. No. 3,719,548.

BACKGROUND OF THE INVENTION

There have always been a number of problems associated with the use of adhesive-backed papers such as those used as labels, etc. These problems, largely related to avoiding premature contact of the adhesive with other objects, have been largely overcome by the use of releasable backing sheets. The need for convenient removal of labels or other adhesive papers from these release-coated backing sheets raised new problems and a considerable amount of inventive effort has been undertaken in solving such problems.

For example, U.S. Pat. No. 3,035,957 to Morgan disclosed a "chemical embrittlement" process which is used to provide embrittled lines along a backing sheet and thereby facilitate the breaking of the backing sheet and the mechanical removal of the sheet from the adhesive. Such a process avoids the need to mechanically score and cut through the release-coated sheet. The avoidance of cut-through eliminates the problem associated with the seepage of adhesive through the cuts. On the other hand, use of chemical compositions present handling problems in the plant, leave an unsightly marking on the sheet, and have a tendency to result in a product that will flake and lint in use.

U.S. Pat. No. 2,319,272 to Starr includes a disclosure of other methods such as knife-scoring, scorching and abrasion of a sheet, to selectively weaken linear portions therealong, on an adhesive-coated rubber patch. Starr's rubber patch may provide an especially high degree of cushioning for the backing sheet being processed; the Starr patent does teach the utility of such support, however.

Thus it is seen that the prior art has utilized various linear weakening techniques such as applying thin lines of acid to chemically weaken selected linear portions of the backing sheet, abrading the sheet to selectively weaken it along the abraded line, cutting through part of the sheet along predetermined lines, etc.

One problem which has interfered with obtaining the maximum product advantage from these processes has been the requirement to leave a rather high safety margin to avoid cutting a slit through the paper during each process. Such cut-through, of course, tends to allow adhesive to seep through the backing sheet and stick to adjacent sheets, thereby completely obviating the advantage sought by using a non-perforating process to selectively weaken the paper.

While it is undesirable to have such adhesive-penetrable weak-spots in the backing sheet, it is equally undesirable to have tear lines which are supposed to crack open when deliberately flexed by the user but which do not do so because the line is not weak enough. Therefore, it will be understood that a selectively weakened line must be deep enough to allow easy splitting but also must be strong enough so that it will not split when it is not supposed to split (for example, by tearing at split points not subjected to deliberate flexing. Such secondary split lines are often provided on release sheets of the so-called "universal-split" type and which are particularly described in U.S. Pat. No. 3,006,793 to Wheeler.)

In many prior art backing sheets, the extra lines were so weak that the sheet would tear at the extra lines and greatly slow down the stripping of the backing sheet and consequently, delay the label-applying process. The compressed paper lines of the instant invention have a relatively high residual strength when compared to the low resistance to breakage when flexed along a score line. As has been indicated above, this strength is a consequence of the uniformity with which weakening may be achieved by use of the present method and apparatus.

SUMMARY OF THE INVENTION

Therefore, it is an object of the present invention to provide an improved process for controllably weakening a protective, release-coated backing sheet for use in backing of an adhesive-coated label stock or the like.

Another object of the invention is to provide improved apparatus for selectively weakening paper along linear portions thereof.

Another object of the invention is to provide a superior process for making a release-sheet-backed label display assembly.

A further object of the invention is to provide such apparatus which performs well when applied to resin-coated paper surfaces.

Another object of the invention is to provide an improved apparatus for selectively weakening linear section of paper sheet.

Other objects of the invention will be obvious to those skilled in the art on reading the instant application.

The above objects have been substantially achieved by a process utilizing a novel tool having a working edge of a relatively large radius with respect to the paper to be compressed, and simultaneously weakened by use of the tool. The use of such an edge has been found to allow a compressing depth of up to 70% or more of the paper thickness without danger of excessively weakening, or cutting through, the paper being processed. The compression of paper caused by use of this tool results in a weakened path which parts easily along a sheet when one bends the sheet along the line of the compressed path. However, the processed sheet also provides a suitable shield against seepage of adhesive. The invention when used with relatively heavy paper, such as clay-coated kraft tag stock of 78 lbs. per ream, does not have any significant tendency to part at embrittled and compressed linear paths along which splitting is required during removal of the backing from an adhesive sheet. This is a consequence of the relative uniformity with which the linear paths can be formed: enough compression can be achieved to give an easy-snapping line but the residual tensile strength is great enough to prevent accidental tearing.

The radius of the edge of the embrittling tool of the invention is from about 0.020 inches to 0.100 inches depending on the thickness of the paper. It has been determined that there should be a bearing surface mounted with compression edge to assure maximum ease of control over the line of compression when light paper stock is being processed. In such cases the cutting edge protrudes a distance from the bearing surface of about 75% of the paper's thickness. By light paper stock is meant paper of about 80 lbs. per ream or heavier and particularly paper of 100 lbs or more per ream. With heavier paper bearing surfaces are not needed to moderate compression, but they are helpful for carrying traction rings and for moderating the rate of compression.

ILLUSTRATIVE EMBODIMENT OF THE INVENTION

In this application and accompanying drawings are shown and described a preferred embodiment of the invention. Various alternatives and modifications thereof, are suggested, but it is to be understood that these are not intended to be exhaustive and that other changes and modifications can be made within the scope of the invention. The suggestions herein are selected and included for purposes of illustration in order that others skilled in the art will more fully understand the invention and the principles thereof, and will be able to modify it and embody it in a variety of forms, each as may be best suited in the condition of a particular case.

IN THE DRAWINGS

Figure 1:
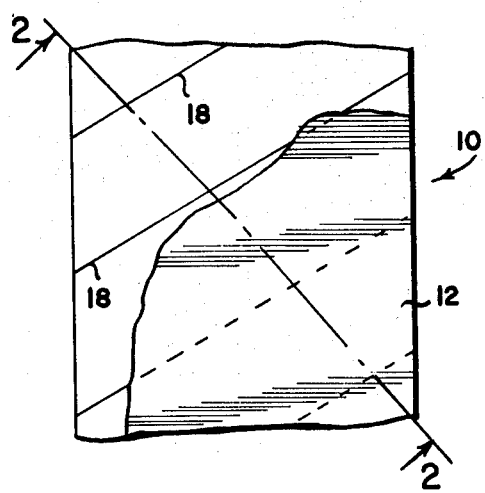
FIG. 1 is a plan view of a segment of a typical backing sheet of the "universal-split type" mounted over an adhesive-coated sheet.
Figure 2:
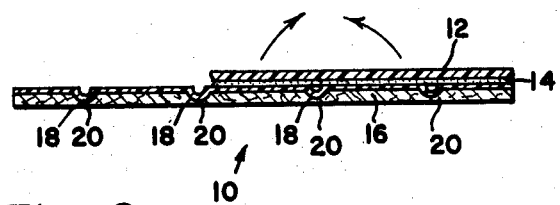
FIG. 2 shows a cross-sectioned, somewhat schematic view of the backed adhesive sheet of FIG. 1.

Referring to FIGS. 1 and 2, it is seen that an adhesive-sheet assembly 10 comprises an adhesive-bearing sheet 12, a coating of adhesive 14 firmly attached thereto, and an adhesive-backing sheet 16. Backing sheet 16 is only moderately adherent to adhesive 14 and may be conveniently peeled therefrom. Such peeling is facilitated by bending sheet assembly 10 toward the label-bearing side and thereby causing it to crack along a line 18 as shown in FIG. 2. The bending causes cracking along the compressed paper 20 of lines 18. This bending will cause an edge of the sheet 16 to become exposed and readily grippable for pulling the remaining part of 16 from the assembly 10.

As indicated in FIG. 1, a backing sheet normally contains a number of weakened lines 18 so that there will be at least one present on the smallest item likely to be cut from the sheet by a manufacturer. In practice, this means that most users will be peeling backing sheet 16 from items containing a plurality of lines 18, some of which are not intended to be ruptured by that particular user. Their remaining intac allows a quick removal of the backing sheet by the user.

Figure 3:
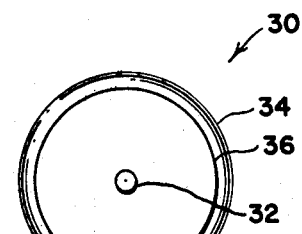
FIG. 3 is a side view of one compression wheel constructed according to the invention.
Figure 4:
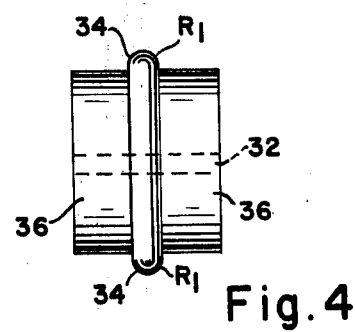
FIG. 4 is an elevation taken normal to the axial direction of the compression wheel of FIG. 3.

FIGS. 3 and 4 illustrate a compression wheel 30 particularly useful in embrittling a relatively light backing sheet. This wheel is mounted on an axis 32 and comprises, in addition to a semi-circular compressing edge 34 having a radius $R_1$ of 0.04 inches, a pair of integrally mounted shoulders 36 which provide means to limit the degree of compression along linear portions of a backing-sheet being treated.

Figure 5:
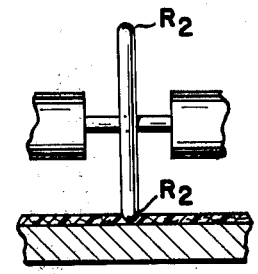
FIG. 5 is an elevation of another compression wheel constructed according to the invention and taken normal to the axial direction thereof.

FIG. 5 illustrates a compression wheel which has a radius $R_2$ of 0.05 inches. Wheels of such radii do not absolutely require limiting shoulders when used to selectively embrittle backing sheets of 8 mils or more in thickness, although use of such shoulders to moderate compression or to hold traction rings is most often desirable.

It is desirable to operate with 78 lb. per ream paper. It is less troublesome to make "universal-split" type assemblies with such paper than with paper of a smaller weight basis. Such 78-lb. paper is about 0.004 inches in thickness when clay-coated to provide a suitable surface for receiving a release coating, e.g. a silicone coating. With such paper, a radius of about 0.025 inches on the compressing edge of the tool is about optimum.

The process can be run most smoothly, however, when "coated tag" papers of 7 to 8 mil caliper are used with a scoring wheel of 0.05 mils in radius and it is such a paper that is most advantageous for use in the process of the invention. When such papers are properly compacted, they break with a sharp snap on being bent about 60° to 90° toward the side which was contacted by the scoring wheel. The compressing is advantageously done by applying the scoring tool to the release-coated side of the paper. This tends to be less stressful on the release coating; strain applied from the opposite side from the release coating often ruptures otherwise suitable release coatings. The pressure is such that the paper is weakened to have a tensile strength of between about 5.0 and about 18 lbs per when tested on an Instron-type tensile-testing instrument Model No. TM 481, an instrument commonly known to the art and sold by Instron Corporation. Most advantageously, the strength of compression line ranges between about 6 to 12 pounds. And this is less than about 8 to 15% of the tensile strength of the paper before it is embrittled by compression.

The test procedure is as follows:

| | |
|---|---|
| Sample Size: | One-inch wide; one inch between clamp-jaws |
| Stain Rate Speed: | one inch per minute |
| Chart Speed: | ten inches per minute |

In general, paper should be weakened to less than about 20% of its original strength by the process of invention.

Figure 6:
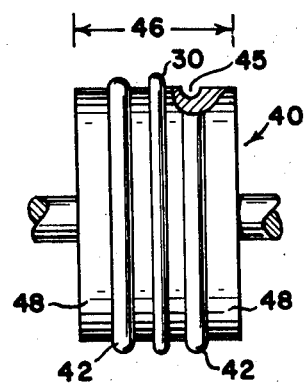
FIGS. 6 and 7 show a particularly advantageous tool formed according to the process of the invention.
Figure 7:
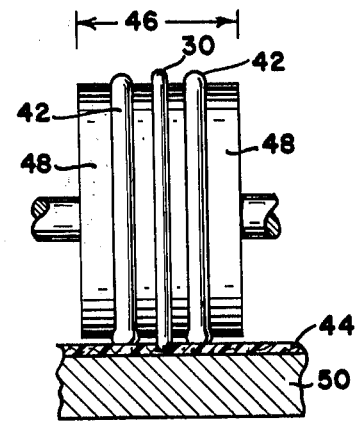

FIGS. 6 and 7 show a particularly advantageous embodiment of the invention. In this embodiment of the invention, a compression wheel assembly 40 comprises set into a groove 45 on each side of wheel 30, a resilient wheel such as an O-ring 42. The wheels 42 help to assure a relatively uniform compression rate and are of particular value in maintaining traction of the wheel on the paper and this assuring its continuous rotation. As seen in FIG. 7, they are compressed when engaged with paper sheet 44 against a firm backing support member 50. Normally these wheels are formed of an elastomeric material such as a silicone rubber elastomer, or BUNA-N type of synthetic rubber. An O-ring about 0.103 in thickness is appropriate; and H2-149 O-ring is particularly suitable, and may be spaced conveniently about 0.15 inch or so from the compressing wheel itself.

The total width 46 of assembly 40 is about 0.75 inches. Wheels 42 and 30 extend about 0.125 inches outwardly from the main body 48 of the wheel.

Production speeds of well over 200 feet per minute are easily attained using the scoring process of the invention because it does not involve a mechanical engagement with the paper as is required in conventional scoring or abrading processes, and it does not require controlled application of a chemical reagent as is required by use of chemical etchants. Indeed the process is not at all limiting of line speed in most cases, that being more limited by drying times. However, when the process is applied to weakening paper in operations not limited by such factors as drying time, it allows excellent improvements in line speeds while maintaining a relatively more uniform weakening of the paper along the line of compression.

It has been discovered that the most satisfactory procedure to use is to compress the paper being treated by application of compression from the release side. This has the special advantage of eliminating descriptions in the release coating which were noticed to occur with some frequency when the coating was extended by strain caused by the scoring tool applied to the non-coated surface of the release paper. Such descriptions, of course, result in an undesirable sticking of adhesive coated labels to the paper substrate and interfere with the convenience with which the mounted labels can be used.

It has also been found that the rupture of the release paper is more uniformly controllable when the paper is bent toward the grooved side rather than away from it.

It is also to be understood that the following claims are intended to cover all of the generic and specific features of the invention herein described and all statements of the scope of the invention which might be said to fall therebetween.

What is claimed is:

1. A process for selective embrittlement of a continuous path on a cellulosic paper comprising the steps of:

A. mechanically compressing the fibers thereof until the paper is less than about 50% of its original thickness, said embrittlement being achieved by supporting one surface of said paper on a support surface and moving said paper relative to a compressing tool having a blunt, rotating, scoring edge of a radius of at least about 0.02 inches and applied against the second surface of said paper, and wherein said paper is a paper at least 0.004 inches thick and said working edge contacts a side of said paper having a surface with a release coating thereon,
    B. controlling said compression pressure by providing bearing surfaces on each side of said scoring edge, and causing said bearing surface to bear against said paper during compression thereof and,
    C. increasing the traction between said bearing surfaces and said paper by compressing resilient elastomer members between such surfaces and said paper.

2. A process as defined in claim 1 wherein said embrittlement reduces the tensile strength across said compressed path to less than about 20% of the tensile strength of the non-compressed paper.

3. A process as defined in claim 1 wherein said bearing surfaces are formed of a silicone resin and said release coating is a silicone coating.

4. A process as defined in claim 3 wherein said compressed paper is about 8 mils thick and the compression path is compacted to have a tensile strength of less than 15 lbs.

5. A process for making a release-sheet-backed adhesive sheet assembly comprising the process of claim 1 and comprising further the step of releasably adhering an adhesive sheet to said release-coated side of said paper.

* * * * *

UNITED STATES PATENT OFFICE
CERTIFICATE OF CORRECTION

Patent No. 3,977,310      Dated August 31, 1977

Inventor(s) Jerry L. Keck & James Robert Rowley

It is certified that error appears in the above-identified patent and that said Letters Patent are hereby corrected as shown below:

Column 4, line 30: after "per" insert --inch--;

Column 4, line 56: change "this" to --thus--.

Signed and Sealed this

Twenty-second Day of March 1977

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,977,310
DATED : August 31, 1976
INVENTOR(S) : Jerry L. Keck & James Robert Towley It is certified that error appears in the above-identified patent and that said Letters Patent are hereby corrected as shown below:

Column 4, line 30: after "per" insert --inch--;

Column 4, line 56: change "this" to --thus--.

Signed and Sealed this thirtieth Day of August 1977

[SEAL]

Attest:

RUTH C. MASON
Attesting Officer

C. MARSHALL DANN
Commissioner of Patents and Trademarks